United States Patent [19]

Woelffer

[11] 3,780,509
[45] Dec. 25, 1973

[54] ROTARY LAWN MOWER CUTTER BAR WITH BI-LEVEL CUTTER

[75] Inventor: Neill C. Woelffer, Racine, Wis.

[73] Assignee: Jacobson Manufacturing Company, Racine, Wis.

[22] Filed: Mar. 2, 1973

[21] Appl. No.: 337,661

[52] U.S. Cl. .................................. 56/295
[51] Int. Cl. ............................ A01d 55/18
[58] Field of Search.................. 56/295, 255, 256, 56/17.5, 503

[56] References Cited
UNITED STATES PATENTS

| | | | |
|---|---|---|---|
| 2,697,322 | 12/1954 | Watrous | 56/295 |
| 3,385,043 | 5/1968 | Seymore | 56/503 |
| 3,477,214 | 11/1969 | Rogers | 56/295 |
| 3,703,071 | 11/1972 | Anderson | 56/295 |

Primary Examiner—Russell R. Kinsey
Attorney—Arthur J. Hansmann

[57] ABSTRACT

A rotary lawn mower having an engine and a cutter bar rotated by the engine and having a grass catcher bag for collecting the grass. The cutter bar has a pair of cutters on each opposite end of the bar, and each cutter has a cutting edge on the rotationally leading side of the cutter. The cutters are both vertically and horizontally offset within their pairs, and the upper one of the cutters in each pair is rotationally in advance of the other one of the cutters so that the leading and upper cutter will cut the grass prior to being cut by the trailing and lower cutter, and thus each blade of grass is cut into two short lengths by the bi-level cutter. An air-fanning blade is also included in the cutter bar and creates a flow of air to convey the clippings from the cutter bar and through the outlet of the mower and into the collector bag.

6 Claims, 3 Drawing Figures

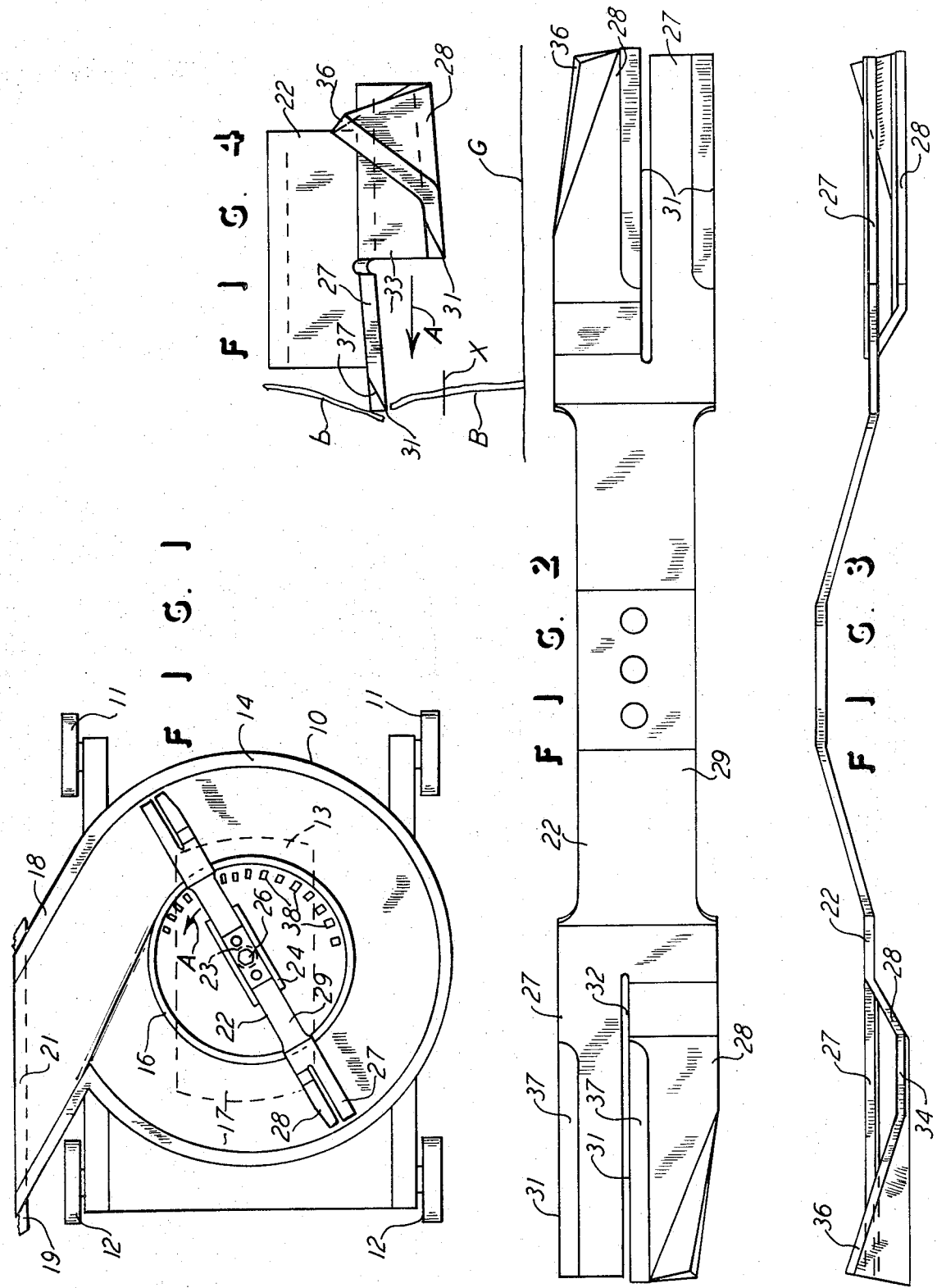

ROTARY LAWN MOWER CUTTER BAR WITH BI-LEVEL CUTTER

This invention relates to a rotary lawn mower cutter bar with bi-level cutters and, more particularly, it relates to a cutter bar which cuts each blade of grass into two cut lengths rather than the usual one cut length, to thereby produce shorter grass clippings for better air conveyance and collection compaction of the clippings.

BACKGROUND OF THE INVENTION

Rotary lawn mowers with cutter bars serving to cut the grass and convey the grass clippings into a bag mounted on the mower are in common use and are well known in the art today. These mowers are popular in cutting grass of different lengths, and for conveying the cut clippings into the collector bag attached to the mower. However, the longer the cut of the severed blade of grass, the more difficult is the problem of conveying the cut grass into the bag, compacting the grass in the collector bag, and ultimately disposing of the collected clippings. That is, when operating the mower in grass which is tall, the prior art mowers commonly make one cut of the grass and this produces a long clipping which is not easily conveyed and compacted in the collector bag. Where the clippings are of a long length in the bag, the density of the clippings in the bag is less than what it could be if the clippings were shorter, so the bag must necessarily be emptied more often and the longer clippings must still be disposed of by decomposing or transferring to another container. In all instances, the longer the clipping is in its length, the more the problem of collecting and disposing of the collected clippings.

Accordingly, it is an object of this invention to provide a cutter bar which produces clippings of short lengths, to thereby facilitate the collection, compaction, decomposition, and general handling of the clipping from the very moment that it is cut until it is finally disposed of.

Another object of this invention is to provide a cutter bar which meets the present day safety standards in the specified time in which the cutter bar must come to rest after being rotated under the influence of a power source, such as a gasoline engine. In accomplishing this object, the cutter bar of the present invention is relatively lightweight, and therefore has a minimum inertia factor, and the cutter bar presents a pair of cutters on each opposite end of the bar for producing the smaller length clippings, as mentioned above.

Still further, it is an object of this invention to provide a bi-level type of cutter bar which produces the small clippings, which meets the safety standards of present-day mower manufacturing, and which can be readily and easily formed in the manufacturing process by either a stamping or a minimum of machining requirements, and the resulting blade is therefore one of minimum complexity and expense in manufacturing and one which can therefore be economically produced and replaced, as desired.

Still another object of this invention is to provide a cutter bar having the aforementioned attributes and which is readily and economically provided with an air-fanning blade for creating the desired flow of air through the mower housing and for conveying the clippings from the housing and into a collector bag so that the grass clippings can be compactly collected in the collector bag attached to the mower housing.

Other objects and advantages will become apparent upon reading the following description in light of the accompanying drawings.

BRIEF DESCRIPTION OF THE DRAWINGS

FIG. 1 is a bottom plan view of a rotary mower having a preferred embodiment of an enlarged cutter bar of this invention.

FIG. 2 is a top plan view of the cutter bar shown in FIG. 1.

FIG. 3 is a front elevational view of the cutter bar of FIG. 2.

FIG. 4 is an enlarged end elevational view of the cutter bar of FIG. 2, and showing it cutting a blade of grass.

DETAILED DESCRIPTION OF THE PREFERRED EMBODIMENT

FIG. 1 shows a conventional type of rotary lawn mower having a mower housing 10 and ground supporting front wheels 11 and rear wheels 12. FIG. 1, being a bottom plan view, also shows the mower power source or engine 13 in dotted lines, and the engine would be sitting on top of the housing 10, in the usual arrangement. The housing 10 includes the usual depending skirt 14 and an interior circularly shaped partition 16 which, together with the skirt 14, forms an annulus 17. An outlet chute 18 tangentially extends to the side and rearward relative to the forward direction of the mower and off the annulus 17, in the usual arrangement. Finally, a grass collecting bag 19 which is fragmentarily shown in FIG. 1 is suitably attached to the outlet 21 of the mower housing 10. Thus, in a substantially conventional arrangement, the mower is of a rotary type and provides the annulus 17 and the outlet 21 and the usual collection bag as fragmentarily shown at 19, all for moving the clippings around at least a portion of the annulus 17 and out the outlet opening 21 and into the bag 19.

Thus, a cutter bar 22 is suitably suspended on the engine shaft 23 and extends in the housing 10 in a horizontal plane, such as shown in FIG. 3. A support connector 24 is shown on the central portion of the bar 22 for mounting the bar 22 relative to the engine crank shaft 23. Thus, in the usual manner, the cutter bar 22 is rotatably connected with the engine shaft 23, and may be secured thereto by means of a bolt 26, and the cutter bar 22 is rotatable under the power of the engine and in the direction of the arrow designated A.

The drawings further show that the cutter bar 22 has a pair of cutters, each cutter of the pair being designated 27 and 28, on the ends of the cutter bar body portion designated 29. Thus the body portion 29 is the central portion of the cutter bar 22, and the cutters 27 and 28 are on the opposite ends of the cutter bar and are therefore disposed immediately below the annulus 17, as seen in FIG. 1. Each cutter bar 27 and 28 has a cutting edge 31 disposed in the rotationally forward position and on the outer end of the respective cutter bar 27 and 28, for engaging the grass and cutting the grass. The drawings, and particularly FIGS. 3 and 4, therefore show that the cutter bar 27 extends horizontally off the body portion 22 at the level of the body portion 22 and integral therewith, and the cutter bar 28 also extends integrally off the body portion 22 but is disposed at a level below that of the cutter 27. Thus, the cutters 27 and 28 are both vertically and horizontally offset from each other, and there is a space designated 32 between the cutters 27 and 28 in the horizontal direction, as seen in FIG. 2, and there is a space designated 33 between the cutters 27 and 28 in the vertical direction, as seen in FIG. 4. It will therefore be seen and understood that the lower and trailing cutter is cutter 28 and it has its offset portion 34 which disposes it at a lower elevation relative to the cutter 27. Also, the outer and trailing edge of the cutter 28 has an air-fanning configuration or blade 36 which induces the air to flow upwardly and radially outwardy in the annulus area designated 17 for creating the flow of air in the annulus and for air-transporting the clippings around a portion of the annulus 17 and out the outlet chute 18.

Still further, it will be seen that the cutters 27 and 28 are both slightly pitched upwardly to the rear relative to their direction of rotation, and such pitch enhances the upward flow of air so that the air moves up toward the upper surface of the mower housing 10 defining the annulus 17.

Each cutter 27 and 28 has its cutting edge 31 in the rotationally leading position relative to the direction of rotation of the cutter bar 22, and thus the cutting edges 31 engage the grass through which the mower is being moved. Also, the cutting edges 31 are formed by an angled cut on each cutter 27 and 28 so that the cutters 27 and 28 are ground or otherwise formed with an upwardly inclined face 37 which therefore positions the cutting edges 31 at the lowest elevation on the entire respective cutter 27 and 28. With the arrangement of the annulus 17 and the air-fanning blades 36 on opposite ends of the cutter bar 22 and even with the pitch to the cutters 27 and 28, air is moved in the annulus 17 after it flows into the annulus partly under the mower housing skirt 14 and partly through the vented openings 38 which extend through the mower housing 10 and pemit the flow of air from above the mower housing 10 and down into the annulus 17. This flow of air therefore assures adequate movement of air and consequent transporting of the cut grass around a portion of the annulus 17 and out the outlet opening 21.

FIG. 4, being an enlarged end view of the cutter bar 22, shows the possible position and action of the cutter bar 22 relative to the ground line designated G. Here is seen that a blade of grass designated B is cut at its upper end by the leading cutting edge 31 of the leading cutter 27 so that the clipping or cut off blade "b" is produced and is therefore available for air conveyance through the outlet 21 and into the collector 19. Subsequently, the cutting edge 31 of the trailing and lower cutter 28 will engage the grass blade B at the lower elevation designated X, and thus a second clipping or cut blade of grass is produced by the cutter.

In the arrangement described, it will therefore be understood that the cutter bar 22 has a pair of cutters on each opposite end of the bar, and these cutters are vertically and horizontally offset from each other and likewise present cutting edges which are vertically and horizontally offset from each other. Further, the rotationally leading cutting edge 31 of the cutter bar 27 is at an elevation higher than the elevation of the cutting edge 31 on the trailing cutter 28, and thus the blade of grass B can be severed into two clippings which are of shorter length than that which would be produced if only one cut were made. With this arrangement, the grass clippings can be more readily conveyed in thorough and complete conveyance through the housing 10, since the clippings are smaller and lighter in weight, and they can also be more completely compacted in the collector 19 because they are smaller in size, and, finally, the smaller clippings will decompose faster and they are easily disposed of because of their smaller size. Still further, the cutter bar 22 meets the safety standards of present day, namely, stopping rotation of the rotary cutter after the power is shut off, and this is true since the cutter 22 is of a minimum size but yet presents the two pairs of cutters on opposite ends, for the bi-level cutting action described. Therefore, the cutter 22 can be formed even in a stamping action where substantially a conventional type of single cutting edge cutter bar is provided and is then altered to present the bi-level cutters shown and described.

What is claimed is:

1. A rotary lawn mower cutter bar adaptable for being horizontally disposed on a lawn mower, comprising an elongated body portion, a pair of grass cutters on each opposite end of said body portion and having cutting edges faced on the respective cutter bar ends in the direction of rotation of said cutter bar and with said cutting edges being on the lowermost portion of said cutters, said cutters which constitute said pairs of grass cutters being offset from each other both horizontally and vertically within each of said pairs and presenting upper and lower said cutting edges within each of said pairs, said upper ones of said cutting edges being rotationally in advance of said lower ones of said cutting edges for cutting the grass at a higher elevation and prior to the time relative to the grass cutting of said lower cutting edges.

2. The cutter bar as claimed in claim 1, including an air-fanning blade included on each opposite end of said cutter bar for creating an upward and circular flow of air during the rotation of said cutter bar.

3. The cutter bar as claimed in claim 2, wherein said air-fanning blade is affixed with each rotationally trailing one of said cutters.

4. The cutter bar as claimed in claim 1, wherein said cutting edges are disposed on said cutter bar elevationally offset from each other by one-half inch.

5. The cutter bar as claimed in claim 1, wherein said cutters are integral extensions of said body portion and are unitary with said body portion, and including an air-fanning blade upstanding on the rotationally trailing end of the rotationally trailing said cutter of each said pair of cutters for upwardly directing the ambient air and the cut grass.

6. The cutter bar as claimed in claim 1, wherein said cutting edges are disposed at the lowest level of said cutter bar, and said cutters being pitched upwardly from said cutting edges for creating an upward flow of air in response to rotation of said cutter bar.

* * * * *